Aug. 30, 1932.   R. C. ANGELL   1,874,413
METHOD OF MAKING SHAFTING
Filed March 28, 1928   3 Sheets-Sheet 3
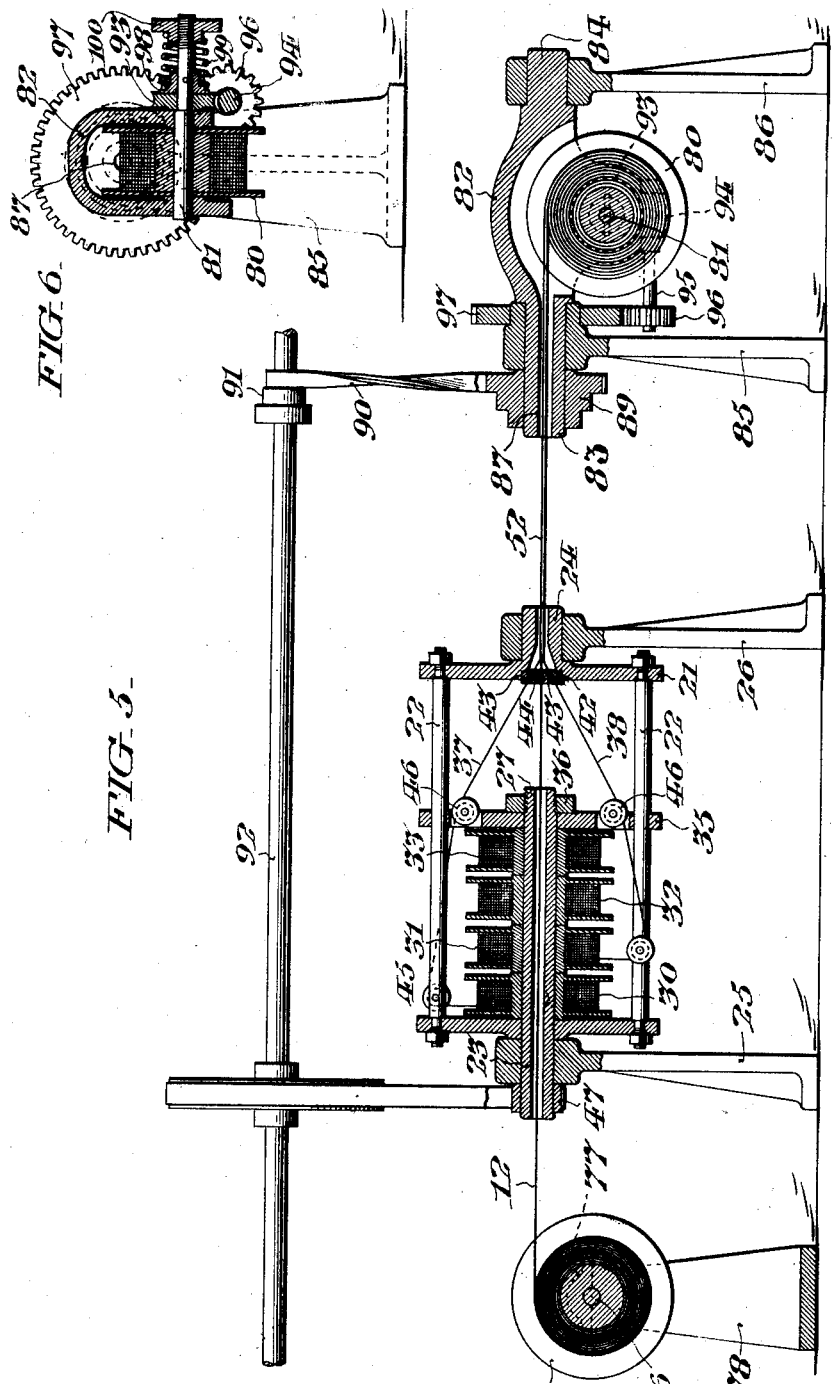
Inventor
Robert C. Angell,
By Clifton C. Hallowell
Attorney Patented Aug. 30, 1932

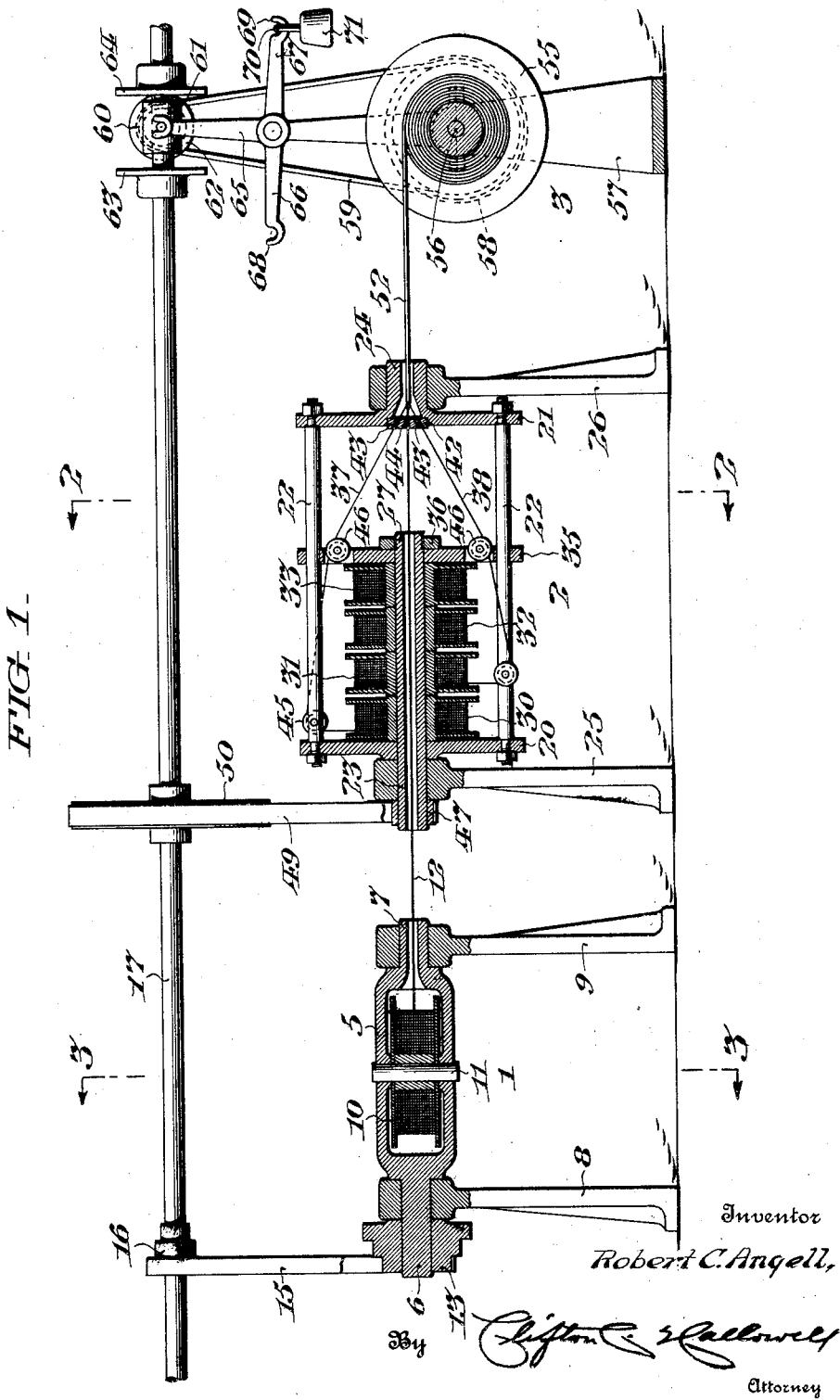

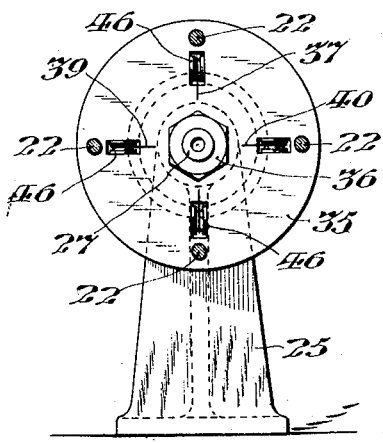
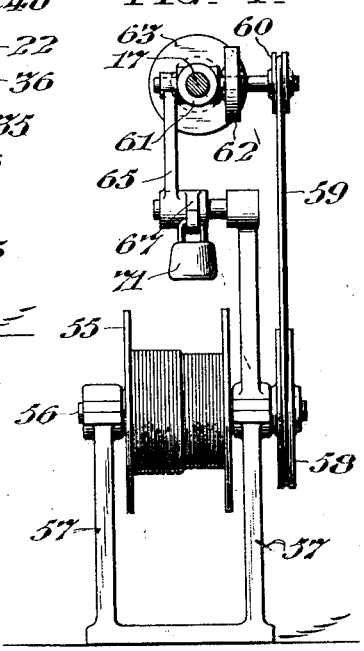
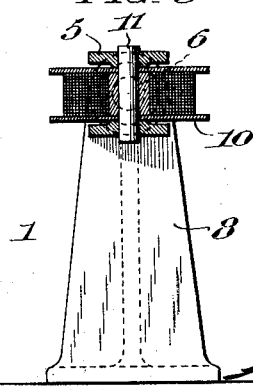
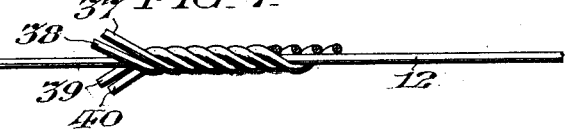
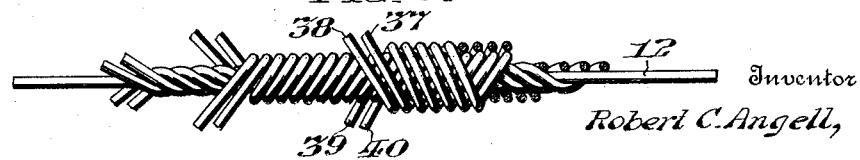

1,874,413

UNITED STATES PATENT OFFICE

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA

METHOD OF MAKING SHAFTING

Application filed March 28, 1928. Serial No. 265,242.

My invention relates particularly to that class of mechanism or machines that are adapted to produce flexible shaft formed of a plurality of strands arranged in superimposed relationship and is especially directed to mechanism wherein a plurality of layers of wire are helically coiled around a mandrel or stranded core to form a stranded structure which may be employed as a driving shaft for connecting movable elements for synchronous actuation, and is a continuation in part of my prior application Serial Number 730,740, from which Patent No. 1,671,951 issued May 29, 1928.

In the production of flexible shaft formed of a plurality of layers of wire or strip material superposed in coiled relation one upon the other, there are stresses initially produced in the product which are due to the forces exerted in the bending of the individual strands in coiling them about the mandrel, which tend to produce torsional stress, and which results in undue internal friction due to pressure contact between the superimposed elements, when such flexible shaft is rotated about its axis in flexed or curved condition, and furthermore, there is a tendency of this fabricated product when released to recoil and thereby twist upon itself into a tangled mass. Owing to the initial stresses and strains present in the individual layers of such flexible shaft it has heretofore been impractical to produce flexible shaft which is sufficiently free from internal friction to be successfully employed as a driving shaft, except in such limited lengths as to require the constant attention of an attendant.

The principal objects of my invention are to provide in flexible shaft producing mechanism, means to so twist the previously applied layer—before applying the next layer thereon—as to reduce the stresses and strains in said previously applied layer caused by the tension of the laying on of said previous layer; and thus produce at each successive step of the operation continuously fabricated lengths of shaft in which all the portions underlying the last applied layer are substantially free from internal friction and which may, without any further operation, be reeled up on suitable drums as it is fabricated.

Other objects of my invention are to provide flexible shaft producing mechanism with relatively rotatable payout and spooling means tending to twist the underlying body or core throughout its free length while the superposed strands are being laid thereon and thus form a composite or fabricated shaft that will be wound on said spooling means with the said core in said twisted condition, without being subjected to modification except by the tension incident to the laying on of the superposed strands during fabrication.

My invention comprehends means arranged to so progress the shaft through the machine as to tend to maintain it under such a constant force at the region of fabrication as to effect laying of the coiled strands onto the core or mandrel in uniform pitch relation.

Specifically stated, the form of my invention, as hereinafter described, comprises a strand bobbin carrier or winding mechanism, disposed between a core spool carrier or payout mechanism and a takeup or spooling mechanism, either of which may be stationary while the other rotates about the axis of the shaft being fabricated, and means connected to effect actuation of said mechanisms thus associated, and to vary their speed of relative rotation.

The purpose of the machine embodying said mechanisms is to produce a flexible shaft in which the various parts of the underlying body—which I have designated as the core—respectively embody relatively opposed stresses which so tend to neutralize each other as to render the said body inert and free from internal friction when flexed.

My invention also includes all the various novel features of construction and arrangement as hereinafter more definitely specified.

In the accompanying drawings, Figure 1 is a vertical longitudinal sectional view of a machine constructed in accordance with my invention; Fig. 2 is a transverse vertical sectional view of the machine showing in Fig. 1 taken through the strand-feeding and winding mechanism on the line 2—2 in said figure; Fig. 3 is a transverse vertical sectional view of said machine taken through the pay-out mechanism on the line 3—3 in Fig. 1; Fig. 4 is an elevational view of the takeup or spooling mechanism as viewed from the right-hand end of the machine; Fig. 5 is a vertical longitudinal sectional view of a machine embodying a modification of my invention; Fig. 6 is a transverse vertical sectional view taken through the takeup reel on the line 6—6 in Fig. 5; Fig. 7 is a side elevational view of a short length of the fabricated structure forming the shaft and showing the first layer of strands coiled upon the core; Fig. 8 is a side elevational view of a section of said shaft showing the second layer of strands coiled thereon; and Fig. 9 is a side elevational view of a section of said shaft showing the third layer of strands coiled thereon.

The machine shown in Figs. 1 to 4 inclusive may preferably be composed of separate units cooperatively connected and comprising a mandrel-dispensing or core payout carrier 1, the strand-feeding and winding or laying-on mechanism 2, and the takeup or spooling mechanism 3.

The core-dispensing carrier has the flier-frame 5 provided with trunnions 6 and 7 rotatably mounted in the standards 8 and 9 and having the mandrel or core-carrying spool 10, which is mounted to rotate in said flier-frame 5 on the shaft 11 whose axis extends transverse to the axis of rotation of said flier-frame 5, and which is arranged to pay out the mandrel or core 12 guided through the hollow trunnion 7.

Rotation of the flier-frame 5 may be effected in any convenient manner, but I have chosen to illustrate a simple method which comprises the pulley 13 secured on the trunnion 6, and having varying diameters arranged to be connected by the belt 15 with a similar stepped pulley 16 on the counter-shaft 17.

The strand-feeding and winding mechanism comprises the strand bobbin frame having its end walls comprising the disks 20 and 21 connected by the spacing bars 22, and respectively having hollow trunnions 23 and 24 mounted for rotation in the standards 25 and 26, the trunnion 23 being extended inwardly to form the hollow stud 27 upon which the bobbins 30, 31, 32 and 33 may be rotatably mounted and removably held in position thereon by the disk 35, which is retained on the stud 27 by the retaining nut 36.

Said bobbins 30, 31, 32 and 33 are respectively arranged to deliver strands 37, 38, 39 and 40 to the strand-twisting die 42, suitably mounted in the disk 21 and having therein suitable apertures 43 through which said strands are arranged to pass, and the aperture 44 for the core 12, which is directed through the hollow trunnion 23, hollow stud 27 and hollow trunnion 24, and about which said strands 37, 38, 39 and 40 are coiled by the rotation of the strand bobbin frame and its die 42.

The strands 37, 38, 39 and 40 are respectively directed to the die 42 by passing over suitable guide rollers or pulleys 45, preferably carried by the spacing bars 22, and over the guide rollers or pulleys 46, which may be conveniently carried by the disk 35.

The rotation of the strand bobbin frame may be conveniently effected by the pulley 47 which is mounted on the trunnion 23 and connected by the driving-belt 49 with the pulley 50 on the counter-shaft, 17, the pulley 50 being of much greater diameter than the pulley 47, so as to rotate the strand-bobbin frame at a comparatively high rate of speed.

As shown in Fig. 1, the stranded structure 52 thus fabricated may be progressed longitudinally, at a predetermined rate of speed, by the takeup mechanism, which may be so driven as to produce a predetermined constant pull to draw out said fabricated cable or shaft. Said takeup mechanism comprises the takeup reel 55, having its shaft 56 mounted for rotation in the standards 57, and provided with the pulley 58 connected by the belt 59 with the pulley 60 which is carried by a suitable slide frame 61 mounted for longitudinal movement on the counter-shaft 17, and having a friction wheel 62 arranged to alternately engage the opposed surfaces of the friction disks 63 and 64.

The friction wheel 62 is arranged to be held in operative engagement with the friction disks 63 and 64 by the double bell-crank 65, which has one arm engaged with the slide-frame 61 and its laterally extended arms 66 and 67 provided with suitable hooks 68 and 69 arranged to receive the loop or ring 70 of the weight 71.

As will be obvious, said weight may be engaged with either of said hooks 68 and 69, depending upon which of the friction disks 63 and 64 the friction wheel 62 is to be engaged, and upon the direction in which the counter-shaft 17 may be rotated, and that the weight may be varied in size, or in its distance from the axis of said bell-crank 65 to increase or diminish the effective force generated to draw the fabricated shaft through the machine.

In this form of my invention the axis of the shaft 56 of the spool 55 is maintained stationary, and the twisting of the core of the fabricated shaft is effected by the rotation of the axis of the shaft 11 of the core-carrying or payout spool 10, about the axis of said core being drawn therefrom.

It will be observed from an inspection of Fig. I that the rotation of the core spool frame 5 (which carries the shaft 11) is in the same direction as that of the winding or laying on mechanism 2; and, since the torque thus imparted to the core body is applied from the left hand end of its free length, the resultant twist therein—as viewed from its advancing end—is opposite to the direction of winding the superimposed coil thereon by the revolution of the strand bobbin head 20—21—22 and the strand winding die 43—43 etc. It follows therefore that this twist in the core body tends to rotate the fabricated product in the same direction as that in which the overlying helical layer tends to recoil or recover when its advancing end is free; but that such rotation is prevented by the holding of the fabricated product, against such recovery or uncoiling, as by its engagement with the spooling device, as shown in Fig. 1.

In the form of my invention shown in Figs. 5 and 6, the core-dispensing carrier comprises the core-carrying spool 75 mounted to rotate on the axis of its shaft 76 which is journaled in suitable bearings 77 on the standards 78, and the core is arranged to be drawn therefrom through the strand feeding and winding mechanism by the takeup or spooling mechanism.

In this form of my invention the takeup reel 80 is mounted to rotate on the axis of its shaft 81 in the rotary frame 82, the axis of rotation of which frame is coincident with the axis of the core 12 and fabricated shaft or stranded structure 52 and is transverse to the axis of said shaft 81, so that as said reel 80 is rotated to progress the core 12 and fabricated structure 52 longitudinally, it is bodily rotated about the axis of said core tending to effect a uniform twisting of the core, and the stranded structure or fabricated shaft is wound thereon with its core maintained thus coiled. In this arrangement the torque which twists the core is imparted thereto at the right hand of its free length—which in this case extends between the point where it leaves the pay-off reel 75 and the point where it is engaged, together with the outer layer, by the takeup spool 80—and the core body is therefore twisted, as before, in a direction opposed to the winding of the helical layer thereon by the revolution of the winding mechanisms 2. For convenience of reference I have designated this twist—as viewed from the advancing end—as a counter-winding twist; and, as already pointed out, this twist is one which will aid, or act in the same direction as, the recoiling, or uncoiling, or recovery, of the outermost helical layer of the fabricated product if, or when, the latter is freed from holding engagement with the take-up reel on which it is spooled.

It is apparent, from an examination and comparison of Figs. 1 and 5, that the rate of twisting of the core body—whether it may be effected by revolving the pay-off reel frame 5 or by the rotation of the take-up reel frame 82—is very much less than the rate at which the strand wires, 37—38—39—40, are wound thereon by the revolution of the strand bobbin carrier, because the ratio between the size of the pulleys 16—13 (or 91—89) is very much smaller than that between the pulleys 50—47. In the manufacturing of flexible shafting—as contrasted with hempen or wire rope—this difference between the rate of twisting of the central core—i. e. the twist per unit length of progressive forward movement—and the rate of coiling of the helical layer thereon (viz. the number of turns of wire per unit length of product) must be large; because the angle of "lay" as it is termed, is very much smaller in a flexible shaft product, such as this invention is designed to produce, than in an ordinary rope or cable. If the core body was twisted at the same speed or at any speed approximating that at which the strand wires are coiled thereon, the central core wire would be strained beyond its yielding point and would be ruptured.

The frame 82 has the trunnions 83 and 84 mounted to rotate on the standards 85 and 86, the former of which is provided with the bore 87 through which the fabricated shaft passes to said takeup reel 80. The rotation of the frame 82 may be effected by the stepped pulley 89, which is connected by the belt 90 with the stepped pulley 91 on the countershaft 92.

The shaft 81 of the takeup reel 80 is arranged to be rotated by a train of gearing comprising the worm gear 93, worm 94, on the worm shaft 95 having the pinion 96 in toothed engagement with the gear 97, which is secured on the standard 85, so, as will be obvious, when the frame 82 is rotated about the longitudinal axis of the fabricated shaft, the takeup reel 80 will be caused to rotate on the axis of its shaft 81.

It will be obvious that the takeup reel 80 and the worm gear 93 may both be secured to the shaft 81 so as to rotate the reel at a predetermined speed and consequently draw out the fabricated shaft at a like speed—provided only one layer of shaft is wound on the drum surface—or said worm gear 93 may be loosely mounted to rotate on the shaft 81 and be frictionally connected with said shaft 81 and takeup reel 80 by any desired form of tension mechanism, such, for typical illustration, as shown in Fig. 6, wherein the friction disk 98 is forced into engagement with the worm gear 93 by the spring 99 and the tension varied by the adjusting nut 100, whereby any desired pull may be exerted to draw out said fabricated shaft.

It is to be understood that the means herein shown and described for actuating the associated mechanism is typical and simply for illustrative purposes, as it is obvious that the parts may be readily connected for cooperation by other means.

Furthermore, it is to be understood that the core body, as carried by the core dispensing carrier, may consist of a single wire strand or a plurality of wire strands twisted on or about the longitudinal axis of the core, or it may consist of such single or multiple strand elements, as just described, with one or more helical coils tightly wound thereon, and held in this initially twisted or tightly wound condition.

My invention is advantageous in that the superposed strands may be laid or coiled about the core, which is concurrently brought to such a condition as tends to compensate or tends to equalize the effects incident to the initial fabrication of the said core. For example, it will be seen that in the manufacture of the product shown in Figs. 8 and 9 the rotation of the core body is in the direction which tends to relieve the initial stresses produced in the fabrication of the product of Figs. 7 and 8 concurrently with the application of the overlying coil by the winding mechanism; and the fabricated structure thus produced may be directly wound upon the takeup reel as it is fabricated without intermediate modification; so that when withdrawn from and separated in the usual way into freed lengths, the resultant recovery or recoil of these freed lengths of shaft will relieve the pressure contact between the last applied or outermost layer from the underlying body, and thus produce a product which is substantially free from internal friction throughout.

I do not desire to limit my invention to the precise details of construction and arrangement as herein set forth, as it is obvious that various modifications may be made therein without departing from the essential features of my invention as defined in the appended claims.

I claim:

1. The herein described process of continuously fabricating flexible shafting which consists in progressively twisting successively delivered portions of a composite core to thereby relieve the initial pressure engagement of the parts thereof, and concurrently winding thereon a superimposed layer of closely spaced wire coils in close pressure engagement therewith.

2. The process of producing flexible shafting by the successive imposition upon a core of coils each wound in a direction reverse to the underlying core which consists in applying a twist in a counter-winding direction to a core upon which a coil has already been wound as it is passed to the mechanism by which a succeeding coil is to be wound thereupon whereby as it receives said last mentioned coil the previously imposed torsional strains in the core are relieved.

In witness whereof, I have hereunto set my hand this 26th day of March, A. D., 1928.

ROBERT C. ANGELL.